March 17, 1936.  W. RITZERFELD  2,034,208
DUPLICATING APPARATUS
Filed July 17, 1931  8 Sheets-Sheet 2
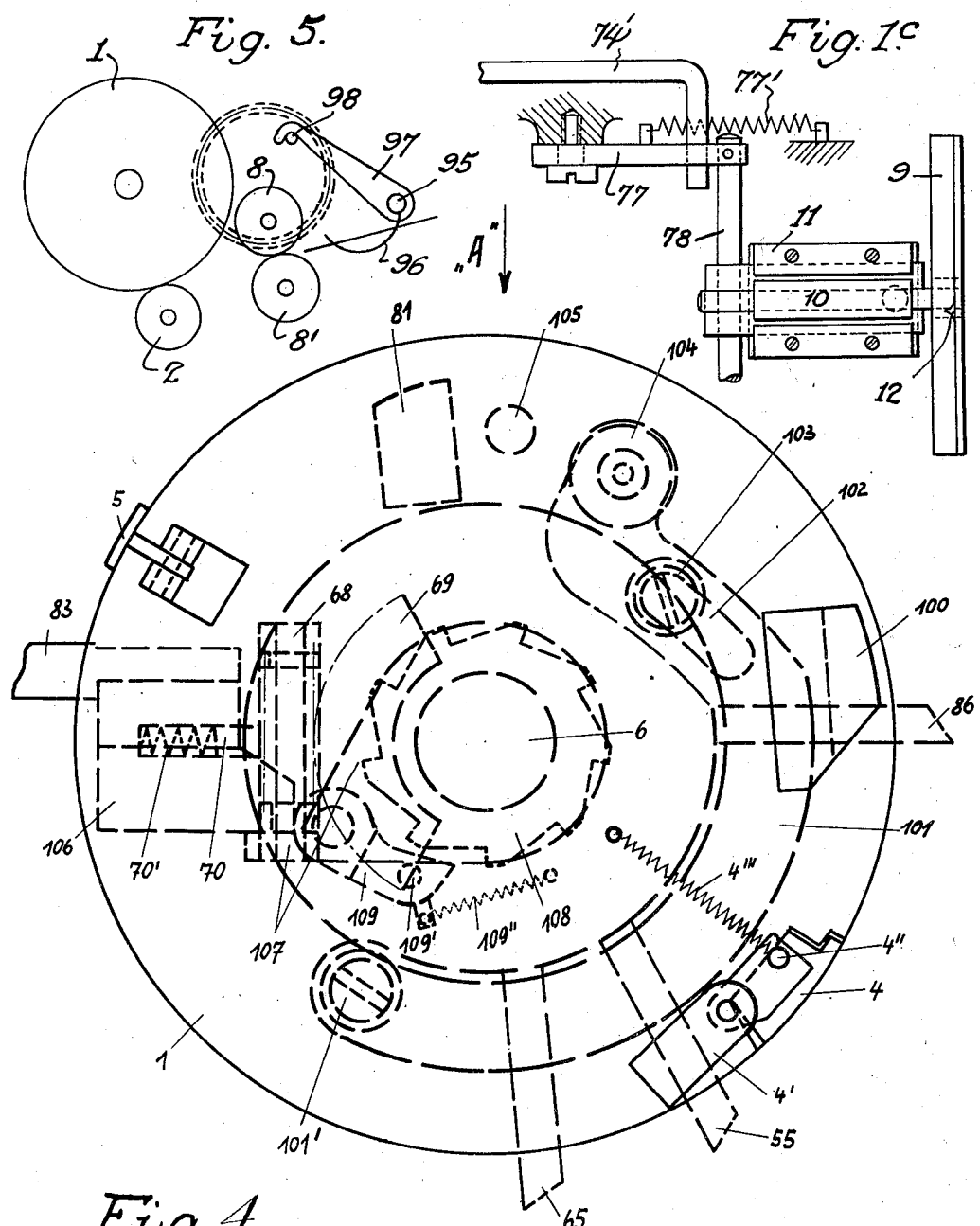

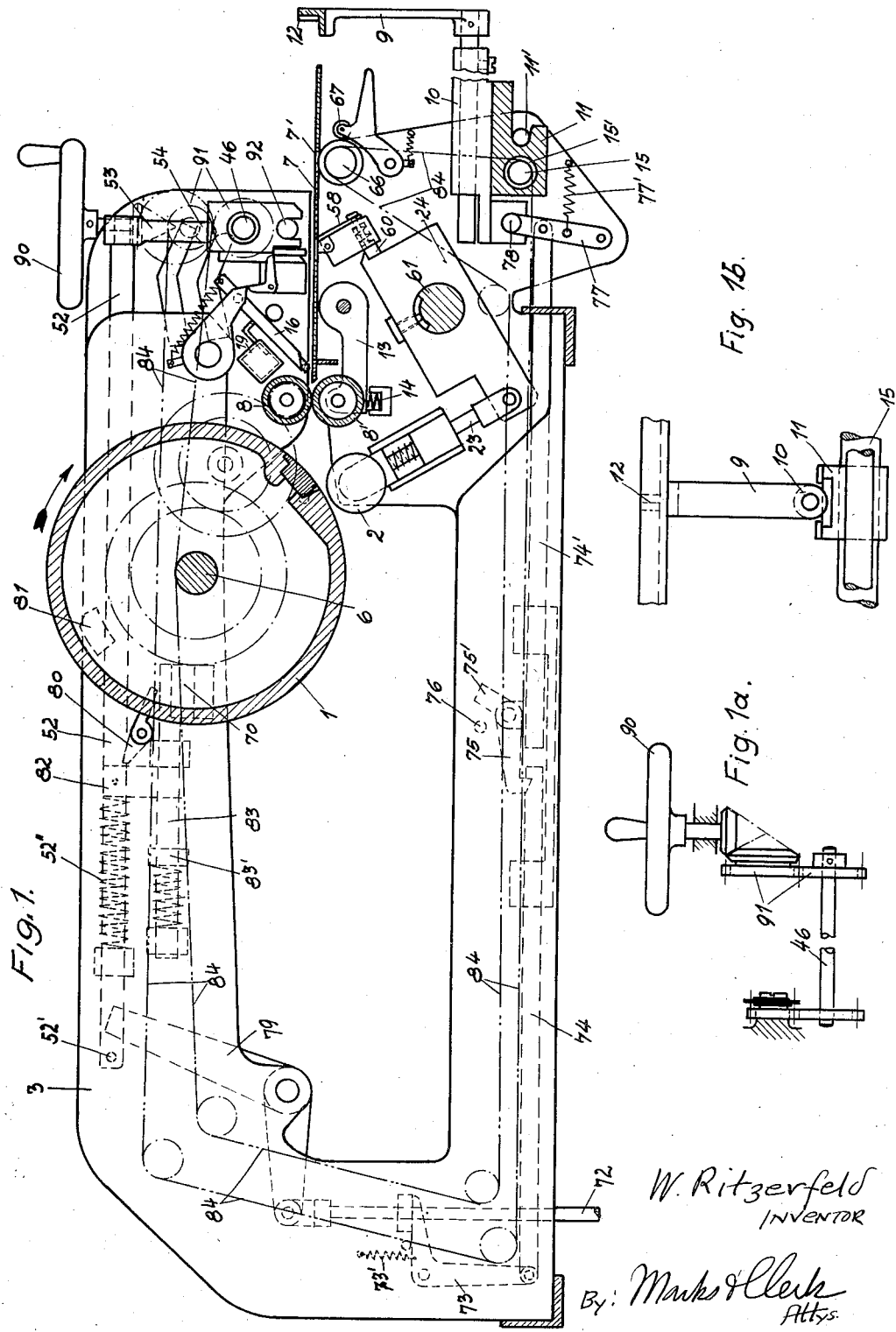

March 17, 1936.  W. RITZERFELD  2,034,208
DUPLICATING APPARATUS
Filed July 17, 1931  8 Sheets-Sheet 3
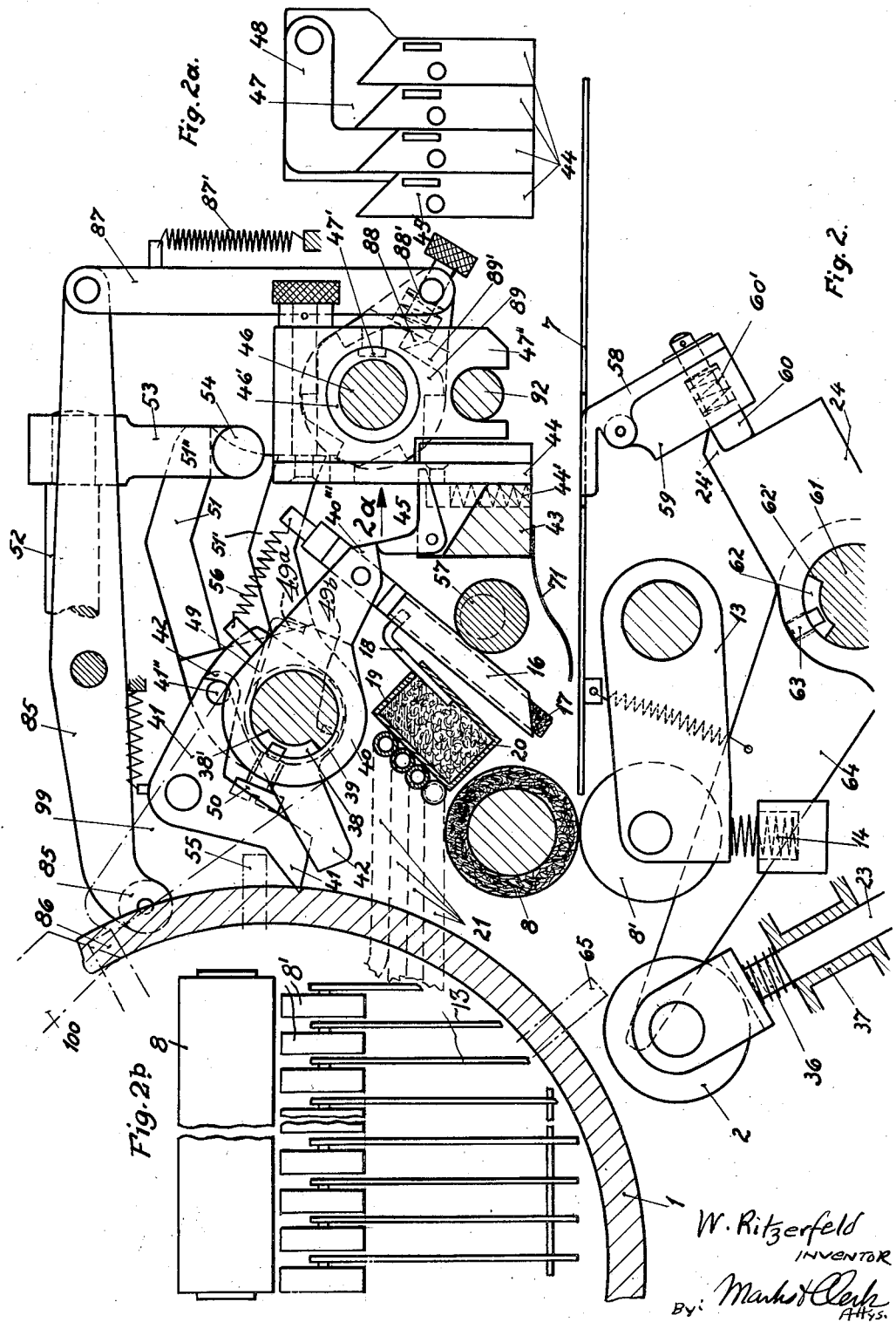

March 17, 1936. W. RITZERFELD 2,034,208
DUPLICATING APPARATUS
Filed July 17, 1931 8 Sheets-Sheet 4

W. Ritzerfeld INVENTOR
By: Marks & Clerk
ATT'YS.

March 17, 1936.  W. RITZERFELD  2,034,208
DUPLICATING APPARATUS
Filed July 17, 1931   8 Sheets-Sheet 5

W. Ritzerfeld
INVENTOR

By Marks & Clerk
ATTYS.

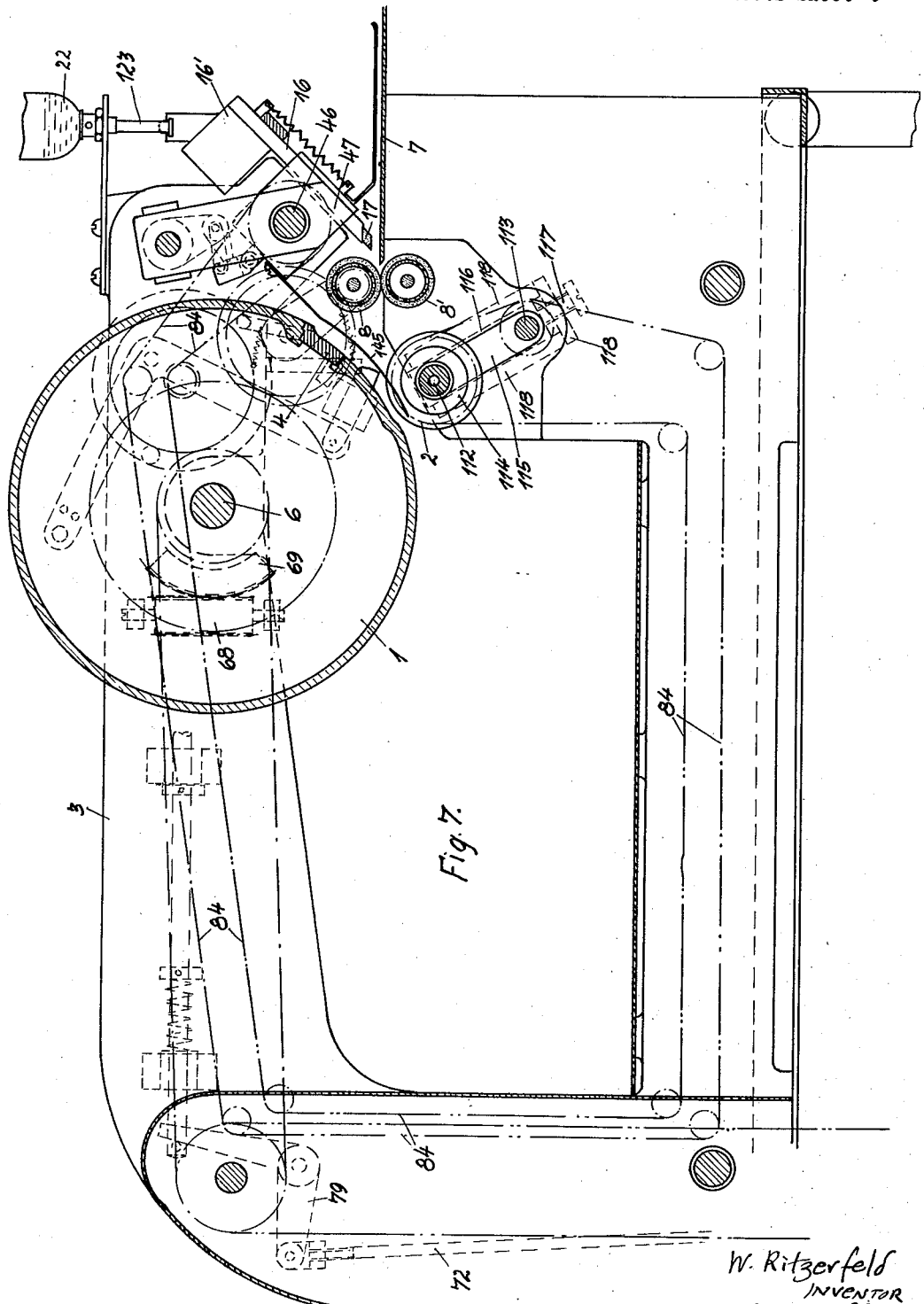

March 17, 1936.                W. RITZERFELD                2,034,208
                              DUPLICATING APPARATUS
                              Filed July 17, 1931            8 Sheets-Sheet 7
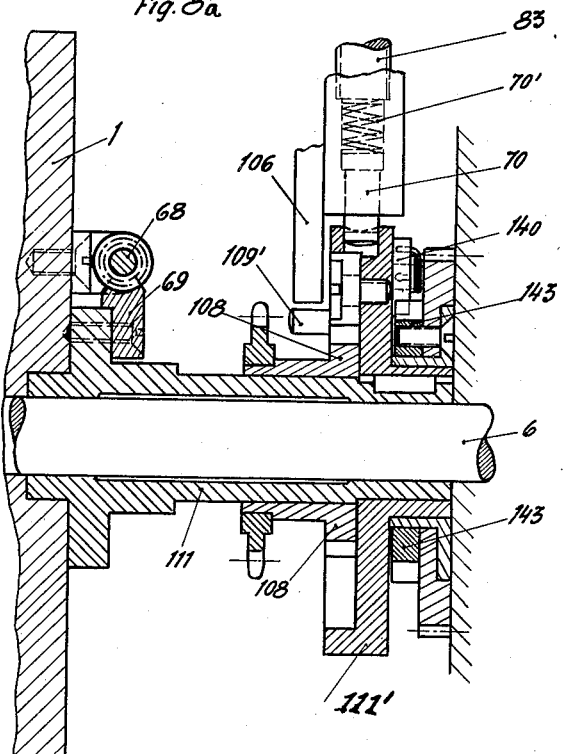
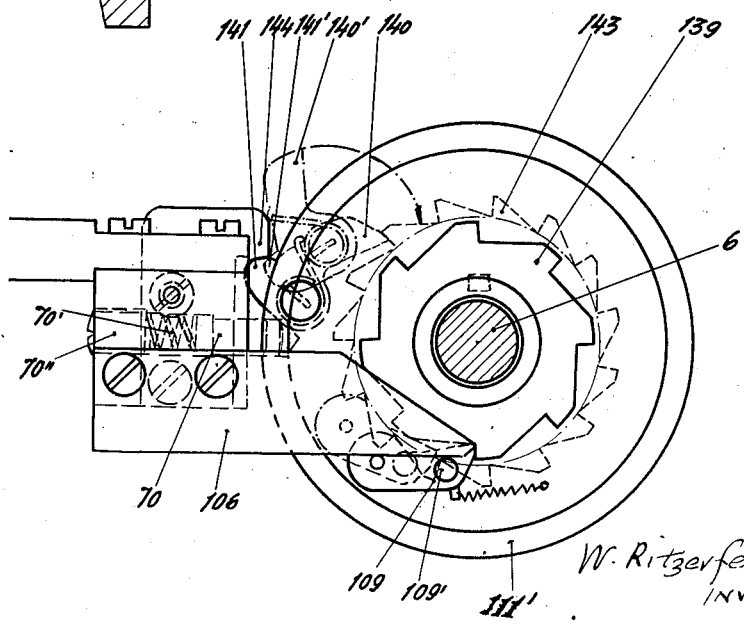

March 17, 1936.　　　W. RITZERFELD　　　2,034,208
DUPLICATING APPARATUS
Filed July 17, 1931　　　8 Sheets-Sheet 8

W. Ritzerfeld
INVENTOR
By: Marks H Clarke
ATTY.

Patented Mar. 17, 1936

2,034,208

UNITED STATES PATENT OFFICE 2,034,208

DUPLICATING APPARATUS

Wilhelm Ritzerfeld, Berlin, Germany

Application July 17, 1931, Serial No. 551,481
In Germany July 14, 1930

115 Claims. (Cl. 101—132)

This invention relates to a method of and apparatus for single line or multi-line duplicating bookkeeping entries or the like by transfer by impressing from an original provided with reversed or mirror script capable of yielding impressions on to sheets, cards or the like (hereinafter called "copy sheets") previously moistened with a readily volatile liquid.

It has already been proposed to manifold mirror script originals capable of yielding impressions, in their entirety in one operation. The apparatus employed therefor, are, however, not suitable for bookkeeping purposes, which are concerned with transferring particular lines or sections of a journal sheet to the respective accounts, because with the said manifolding apparatus single lines or sections cannot be selectively impressed.

Moreover, apparatus have already been proposed for transferring from single lines or sections by impression from an original provided with mirror script capable of yielding impressions on to sheets previously moistened with readily volatile liquid. These apparatus operate, in close resemblance to the above mentioned apparatus for entire impression, always in such manner that the journal sheet presenting the mirror script capable of yielding impression is so mounted in the apparatus that its lines are located transverse to the direction of view of the operator. The sheet or card to receive the impressions is in these previous apparatus always inserted from the front perpendicularly to the direction of the lines of bookkeeping. In these previous apparatus the moistening of the lines to be impressed is effected either by a moistening contrivance which extends over the entire line being lowered and raised, or by a moistening contrivance being displaced transversely over and moistening the card.

The above relative arrangement of the mirror script sheet and the card has many disadvantages and necessitates a complicated apparatus. The moistening contrivance of the width of the apparatus and briefly applied and thereupon raised or the to-and-fro moving moistening contrivance often give rise to interruption. The volatile liquid must moreover first distribute itself towards all sides in a moistening contrivance of the width of the apparatus, and it can happen that with insufficiently thorough moistening of the felt or with defective renewal of feed of the liquid, individual portions of the card are insufficiently or even not at all moistened. The last defect can also occur by unevenness of the card or of its underlying supporting surface. In addition these apparatus operate somewhat slowly.

All the above defects are avoided by the line by line transfer being effected in an entirely different manner differing in all respect from the previous method, and which forms the invention. As opposed to all previously proposed transversely operating apparatus, the bookkeeping sheet is, in the present invention, mounted with the direction of the lines in the direction of view of the operator. The account card is inserted from the front, but not, as previously, perpendicularly to the direction of the lines of bookkeeping, but it is guided beneath the original and displaced in the direction of the lines of both the original and the card.

In contradistinction to all previously proposed methods of moistening, moisture is applied to the card at the place which is to receive the impression, by a moistening contrivance mounted in a fixed position, which remains stationary during the forward transport of the card and moistens at the place to be impressed the card drawn beneath it. This is an important technical advance, because in this manner a rapid, quiet, clean and absolutely reliable moistening and impressing are rendered possible. The moistening contrivance, of which only a comparatively small surface is applied to the paper sliding through beneath same, always contains sufficient liquid and the moistening occurs always uniformly even with a wavy card or with unevenness of the underlying supporting surface therefor.

The impression of the moistened portion is effected by a pressing element pressing same against the portion of the original which is to yield the impression.

Moreover, with the hitherto proposed apparatus it is possible to impress only one line at a time. If, as often occurs in bookkeeping, several successive entries of a journal sheet are to be transferred to the same account card, such card has to be inserted in the machine as often as there are entries to be impressed on the card. Even this disadvantage disappears by employing the above mentioned new principle of operating because it is now possible to provide alongside each other as many moistener containers of line breadth and as many pressing elements of line breadth as desired, of which as many are set in operation at a time as there are lines to be moistened and impressed, so that consequently, and in accordance with the invention, one or any desired number of lines can be moistened and impressed in one operation.

The apparatus according to the invention has a duplicating cylinder on which the mirror script original for yielding impressions is so mounted that the lines thereof extend circumferentially around the cylinder. The apparatus may have any desired number of moisteners of line breadth, which serve to moisten with a volatile liquid dissolving the ink of the mirror script original, the desired number of lines to receive impressions on the bookkeeping card or the like. The apparatus may also have any desired number of pressure rollers or discs of line breadth. The moistened card to receive impressions is led between the rotating duplicating cylinder and the pressure rollers. The latter press the moistened portion of the card against the line or lines to yield impressions of the original mounted on the duplicating cylinder, whereby the particular lines are transferred to the bookkeeping card.

The duplicating cylinder is mounted in rearwardly extending supporting arms, in order to provide a free passage between the cylinder and the counterpressure rollers. For this reason the driving means (chains, sprockets or the like) for the moistening contrivances and the pressure rollers are mounted alongside of the supporting arms. The card to receive impressions can therefore freely pass everywhere between the arms and laterally beyond same, whereby it is only now rendered possible to impress the first as well as the last line of the transfer sheet on to the first or last line of the card, which then protrudes laterally beyond the apparatus.

In their positions of rest the moisteners are raised from the paper feed table and the pressure rollers are withdrawn from the duplicating cylinder. The setting in operation of both, i. e. the application of the moisteners to the paper to receive the impression and the pressing of the pressure rollers against the duplicating cylinder occurs by means of a releasing contrivance preferably so that each moistener released sets in operation its respective pressure roller.

The releasing contrivance is conducted past the individual moisteners by means of a spindle or the like. The releasing contrivance releases after each impression automatically the next moistener and the next pressure roller. After the releasing device has been rendered inoperative the same line can be impressed several times.

If several successive lines are to be simultaneously impressed the additionally required moisteners and pressure rollers are released by hand.

In order that the card to receive the impressions shall be inserted and pass straight and in the direction of the lines between the duplicating cylinder and the pressure rollers, feed rollers are preferably mounted in front thereof, which feed the card to the impressing position.

The apparatus according to the present invention for transferring by impression any desired number of lines, is not only suitable for use where a number of successive bookkeeping entries on the original sheet are to be posted to the same account and therefore impressed on the same card, but it is readily possible with this machine to impress a large number of wage envelopes, wage strips or the like in one operation. For this purpose, the wage list is produced as a mirror script original and stretched around the duplicating cylinder. Further, for the purpose as many wage envelopes as lines on the wage list are provided and arranged scoop-like and joined together as a whole in such a manner that the upper or lower border of each wage envelope is exposed.

Such assemblage of wage envelopes is in the usual manner inserted in the machine and impressed. In this manner, for example thirty-five or more wage envelopes can be simultaneously inscribed. As such an assemblage of wage envelopes is not uniformly thick, as at the ends thereof less wage envelopes are superposed than at the middle, it is necessary for this reason to constitute the feed rollers so that one thereof is divided into several rollers in order better to conform to the unevenly thick pack of wage envelopes and to ensure a uniform and straight forward feed.

For more convenient and exact laying on of the cards to receive impressions, a special applying contrivance can be additionally provided, which is set in operation before the beginning of the rotation of the duplicating cylinder and is adjustable for different sizes of forms. Before or after each impression, this laying on contrivance is, like the releasing contrivance for the moisteners, automatically advanced one line. If several successive lines are simultaneously impressed, the laying on contrivance, together with the releasing contrivance for the moisteners, is displaced laterally by hand the desired number of lines.

The machine can be driven electrically or by hand. After switching on the motor or by actuation of a hand crank the drive rotates free. By release of a pedal or hand lever, connection between the machine and the drive is established. After one operative cycle the machine is stopped by an arresting device while the drive continues to run.

In previously proposed bookkeeping apparatus the line to be impressed of the mirror script original is rendered visible and legible by a mirror in which the mirror script appears in legible script. Such mirrors, however, have disadvantages. For example it is necessary always to look into the mirror in the same viewing direction. If the angle of view is changed, either no line at all is seen or a line other than that which is actually to yield the impression. In accordance with a feature of the invention this disadvantage is avoided. No mirror is used but on writing the mirror script original a carbon copy thereof is simultaneously made and, at any suitable part of the impressing apparatus, is wrapped around a roller which is angularly advanced by hand or by the general drive after each impression, automatically one line. In this manner the line of the mirror script original then to be impressed appears before the operator of the apparatus in legible script. Conveniently this roller is mounted beneath the applying table for the account cards and this applying table is formed with a slot in which the then to be impressed line appears in legible script.

If the bookkeeping apparatus is always to impress only one line at a time, only one moistener and one pressure roller need be provided. In the same manner as the releasing contrivance advances laterally with the apparatus constructed for multi-line impression, the moistener and the pressure roller are displaced to the next line in the machine for only single line impression.

When all the lines are not to be impressed successively, but only selected lines, the moistener and with it the pressure roller can be respectively lifted and withdrawn by hand and displaced as desired.

The apparatus may be provided with a marking device which marks each impressed line of the original before, during or after the rotation of the duplicating cylinder and advances from line to line together with the elements effecting the impression.

In the constructional form of the machine for only single line impression, the laying on contrivance, the moistening contrivance simultaneously with the pressure roller, the arresting device for the duplicating cylinder and the feed rollers, as well as the optional marking device are also released or set in operation successively.

The invention will now be described more fully with reference to the accompanying drawings, which illustrate by way of example a possible form of embodiment of the invention.

Fig. 1 is a side view of the machine for single and multi-line print.

Fig. 1a is an elevational view of the hand gear of the actuating mechanism for the moisteners and pressure rollers.

Fig. 1b is an elevation of the positioning device for the copy sheets or the like.

Fig. 1c is a detail view in top plan of the copy sheet positioning device.

Fig. 2 is a side view of the operating means for the moisteners and pressure rollers.

Fig. 2a is a front view of the actuating mechanism for the moisteners and pressure rollers.

Fig. 2b is a detailed front view, somewhat fragmentary, of the feeding rollers shown in Figs. 1 and 2.

Fig. 4 is a side view thereof.

Fig. 5 is a side view of the locking device.

Fig. 7 is the side view of a form of embodiment intended only for single-line print.

Fig. 8a is a cross-section through the retarding device as applied to a machine for single-line print.

Fig. 8b is an elevational view thereof.

Figure 3:
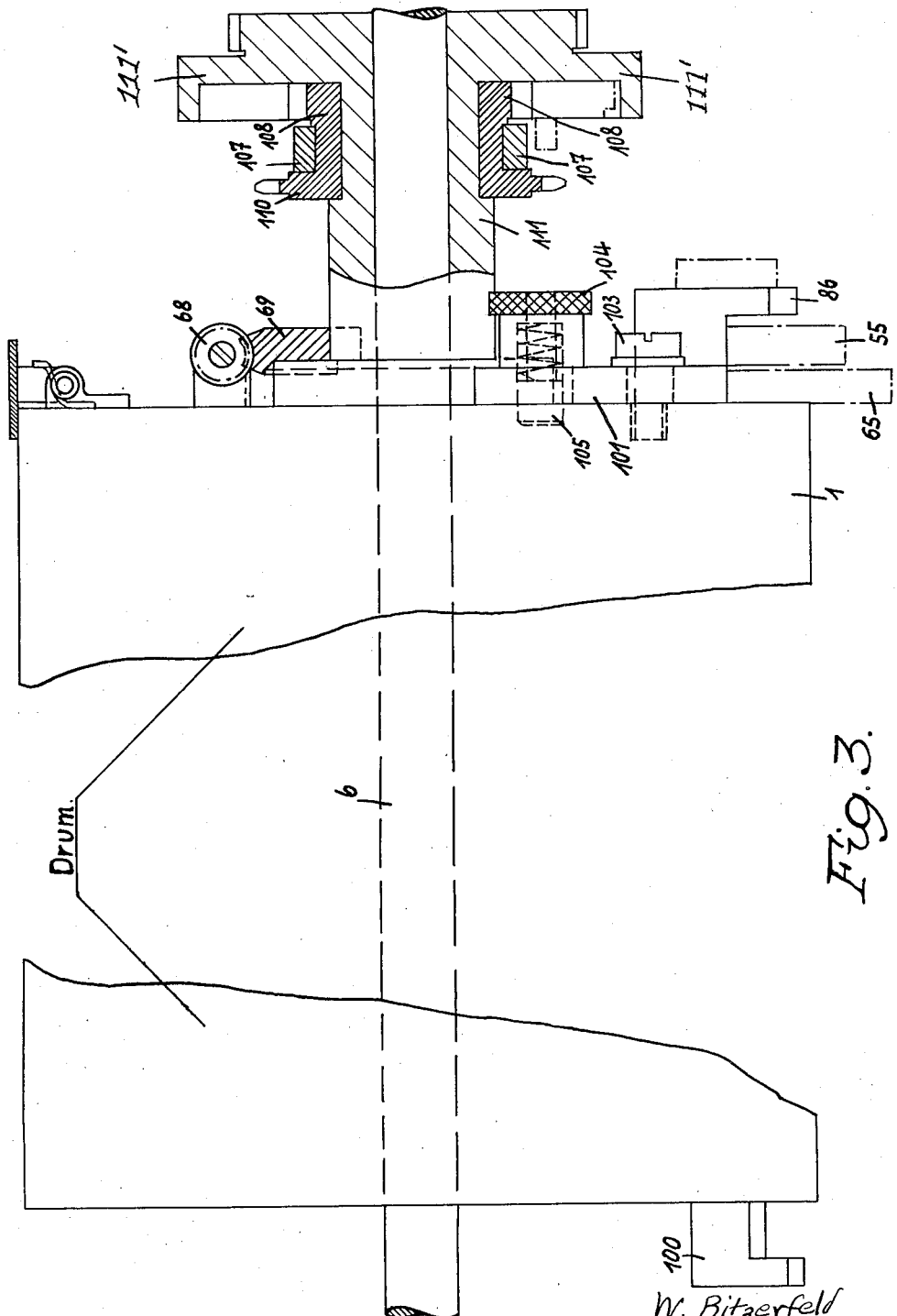
Fig. 3 is a front view of the duplicating cylinder.
Figure 6:
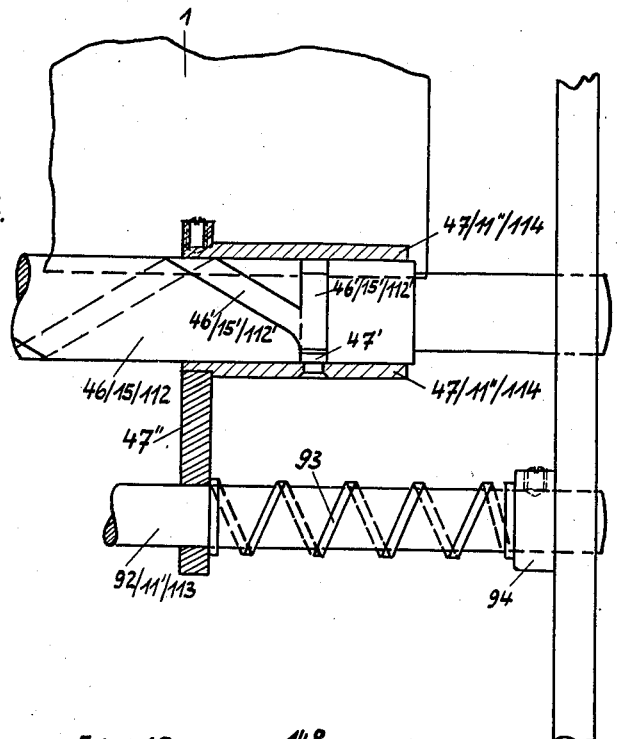
Fig. 6 is a view of the safety means for the lock nuts.
Figure 10:
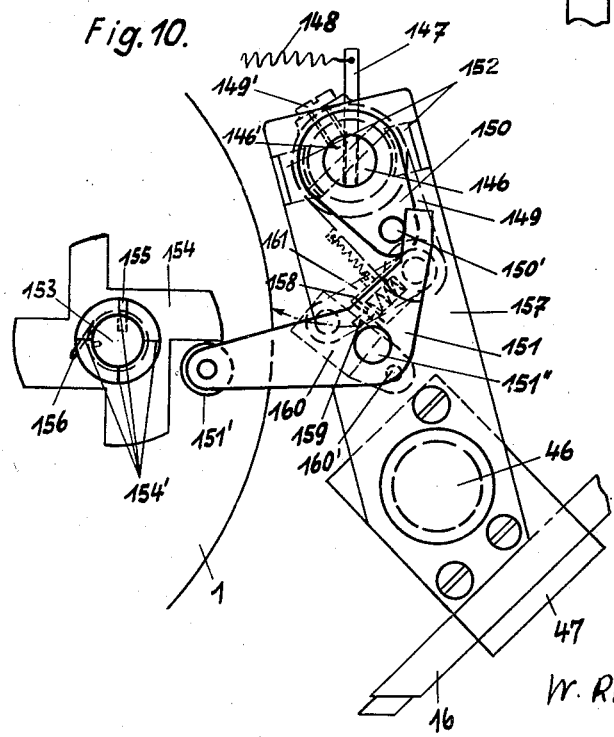
Fig. 10 is a side view of the marking device in the case of machines for single-line print.

Referring now to the drawings, the duplicating cylinder is mounted for revolution in supporting arms 3 extending towards the rear. The original sheet bearing the reversed script is secured with its one end to the duplicating cylinder 1 by means of the clamping bar 4, vertical to the cylinder axis 6. The clamping bar 4 is oscillatory about its one longitudinal edge, and is mounted in bearings 4' located on the side wall of the roller 1. The clamping bar 4 is lifted by hand by means of the grip 4", and is closed by the spring 4'''. In the closed condition the bar 4 is situated flush with the peripheral surface of the cylinder 1, in order to avoid damage to the pressure roller 2 pressing against the cylinder 1 during the printing or copying operation. The opposite end of the original sheet is held on the cylinder 1 by a resilient clip 5, which is pivotally mounted at one end of the cylinder and may be oscillated away laterally.

The card or the like to be printed is placed on the table 7 between the feed rollers 8 and 8', and is conducted by these between the duplicating cylinder 1 and the pressure rollers 2, and after effected printing operation falls down behind the duplicating cylinder with the script face upwards.

The cards or the like may be furnished with incisions along their two side edges, these incisions conforming in their spacial relation to the spacing between the lines, so that an incision is located against each line to be printed.

The card to be printed abuts with the particular incision against a projection 12 on the positioning device 9. The latter is mounted in a sliding bearing 10 in a manner allowing the same to be displaced or held in position as desired, so that it may be adjusted to different sizes of cards. The sliding bearing 10 is mounted on a locking means 11.

The positioning device 9 with the card, wage bag or the like located thereon is, at the commencement of each operation, displaced in the direction of the feed rollers 8 and 8' by the driving gear of the machine, which is described later, so that the card is engaged by the feed rollers and passed to the printing point in essentially accurate and proper position conforming to the line.

On the transverse member 43 there is provided a feed plate 71 which depends downwardly almost on to the table 7, and flattens out any bent edges or corners in the case of cards which may have been in use for some length of time, thus ensuring a proper positioning of the card.

The part 11, and accordingly the entire positioning device, may be displaced laterally by means of a spindle 15.

One of the two feed rollers 8 and 8', and preferably the lower one 8', is divided into a plurality of sub-rollers, which are each pivoted on an oscillatory lever 13, and are pressed by springs 14 against the upper roller 8, so that, for example when printing on wage bags arranged to overlap each other in the manner above referred to, these sub-rollers are capable of better adaptation to the different thickness of the bags.

In order to be able to copy from the original sheet furnished with the reversed script several consecutive lines, or even, if desired, all lines thereon, which may amount in all to, say, 35, in one operation, there are provided an exactly corresponding number of moisteners 16 and pressure rollers or wheels 2, each of single-line width.

In the single moisteners 16 there are provided the moistening strips 17, which may consist, for example, of felt, and communicate with the one end of a wick or other capillary acting means 18. The opposite end of the wick 18 is in contact with the absorptive material 20 (felt, cotton wool, etc.), which is contained in the distributing container 19 and conveys the liquid in uniform distribution to the moisteners 16.

On a shaft 39 furnished with a longitudinal groove 38 there are provided the plates 40, which are each pivotally connected with a moistener 16. On the transverse member 43 arranged in front of the moisteners 16 are the actuating tongues 44 and the angle members 45. The operating lock 47 bearing an actuating pawl 48 is mounted in sliding fashion on a spindle 46. By rotation of the spindle the part 47 is displaced laterally, whereby, with the assistance of the pawl 48, the single tongues 44, which are lifted by springs 44', are depressed. The angle members 45 engage in slots 45' in the tongues 44, and upon depression of the latter are caused to recede, so that the plates 40 situated with their projections 40''' on the angle members 45 are depressed together with the appertaining moisteners 16 by the springs 49 until the screws 50, which are provided in the plates 40 and engage in the longitudinal groove 38 in the spindle 39, thrust against the edge 38' of the groove 38. By this operation the moisteners in question have been released for action, but do not yet rest on the card positioned on the table 7.

On the one end of the shaft 39 there are mounted the cam levers 51 and 51'.

Upon depression of a pedal release described later the rod 52 carrying the lever 53 with the roller 54 is withdrawn, so that the roller 54 presses against the cam 51', and at the same time causes partial rotation of the shaft 39, whereupon the moisteners 16 prevented up to now from moving against the card by reason of the fact that the screws 50 thrust against the edge 38' are now able to contact with the card under the pressure of the springs 49. Each spring 49 is provided with angular ends 49a and 49b engaging the plate 40 and spindle 39 respectively.

After completion of each printing operation the rod 52 again returns, so that the roller 54 now presses against the upper cam 51, and thus lifts the spindle 39, and accordingly the plates 40 resting with the screws 50 against the edge 38', together with the moisteners 16, to approximately half extent (position of release). The pawl 55 on the duplicating cylinder I pushes away the projection 41' of the locking lever 41, which rests with the bolt 41''' mounted thereon against the projection 42' of the actuating or releasing lever 42, so that when upon additional rotation of the duplicating cylinder I the pawl 55 thrusts against the lever 42 mounted on the spindle 39 the latter is rocked and accordingly the spindle 39 also moved back.

Upon this return movement of the spindle 39 the edge 38' again presses against the screws 50 of the released plates 40, or moisteners 16 respectively, whereby the latter are lifted into the normal position. The movement of the lever 99 against the cam 100 on the duplicating cylinder I causes the shaft 39 to be moved back to a short extent, so that upon renewed actuation of the moisteners 16 the plates 40, together with the moisteners 16, are capable of being lowered to such extent until the screws 50 again rest against the edge 38' of the groove 38.

By means of tension springs 56 secured to the plates 40 and the upper ends of the moisteners 16, the latter are pressed against an eccentric shaft 57. Upon rotation of the shaft 57 the moisteners 16 may be moved, as desired, more towards the front or the rear against the card to be printed.

If, for example, more than one-half of the total number of moisteners are released for action, it may occur that the shaft 39 is caused to be rotated under the action of the numerous springs 49, so that the single moisteners move prematurely against the table 7, possibly before the card to be printed has been placed in position. This is prevented by the fact that the upper cam 51 rests with the face 51'' against the roll 54. It is not until the roll 54 has been displaced by withdrawal of the rod 52, i. e., until the card to be printed has been properly positioned, that the cams 51', or 51, are moved away from the roll 54 with the assistance of the springs 49.

In those cases in which a printed line is required to be printed again, for example on another card, the moistener 16 would, by the pressure of the roller 54 against the upper cam 51, again be lifted into the position of release, but the pawl 55 on the duplicating cylinder I would be disconnected, so that it could not move into engagement with the lever 42. In consequence, the lifting of the one moistener into the normal position does not take place, and upon renewed actuation by means of the pedal release the moistener, as described above, would again be depressed by the roller 54, the cam 51 and the spring 49. Since, however, return of the shaft 39 has not taken place by pressure of the pawls 55 on the lever 42, the remaining, say, 34 springs 49 are tensioned and exert on the spindle 39 a force opposing the downward movement of the moistener 16, tending to move back the spindle 39, whereby movement of the moistener against the card cannot take place. To prevent this unintended return movement of the spindle 39 there is provided the locking lever 41, which rests with the bolt 41'' against the projection 42' of the lever 42 mounted on the shaft 39, this precluding any possibility of reverse movement on the part of the latter.

The pressure rollers 2 are mounted to rotate on levers 23, which are displaceable in the bearings 37. These levers 23 are pivotally connected with the plates 24.

The actuation of the pressure rollers is as follows: The tongues 44, which actuate the moisteners 16, also release the pressure rollers. The tongues in question, immediately the same have been depressed by the pawl 48, move the lever 58 upwards, whereby the holding pins 60 mounted in a transverse member 59 are withdrawn, and the plates 24 resting with the projectory portion 24' against the pin 60 are released, so that the pressure rollers 2 pivotally connected therewith are pressed by the springs 36 against the duplicating cylinder I.

In the shaft 61 there is provided a longitudinal groove 62, which is engaged by the single screws 63 on the plates 24. The released plates rest against the duplicating cylinder I, so that the screws 63 are situated closely in front of the edge 62'. After completed printing operation the released plates 24, and accordingly the corresponding pressure rollers 2, are lifted by a downward rocking movement of the lifter 64, which is actuated by the pawl 65 on the duplicating cylinder I, the edge 62' pressing against the screws 63 in the plates 24. Immediately the plates 24 have moved back into their normal position the holding pins 60 are again conducted in front of the projections 24' of the plates 24 by the springs 60'. The levers 58, which lift the pins 60, rest in corresponding recesses in the table 7, and are flush with the same in their position of rest, so that the cards to be printed may be readily placed on the table. Since the tongues 44 are lifted by the springs 44' when in the normal position, the space available for introduction of the cards, etc., is in no way limited or obstructed.

The copy produced together with the original sheet and bearing the designation for the particular account is placed over the roller 66 situated below a recess 7' in the table 7, and is held by a spring-urged pressure roller 67 pressing against the first roller. The roller 66 is connected in suitable fashion, for example by means of a chain, with the driving gear for the duplicating cylinder (described later) and the driving gear for the pressure rollers, and is advanced to the extent of one line upon each revolution of the cylinder I, so that after effected printing operation the designation for the next, or, in the case of a sufficiently wide recess 7', the designations for the next two lines to be printed appear in the said recess.

To permit of accurate transfer to printed forms the duplicating cylinder I may be adjusted in its initial position. On the bush III rotatably mounted on the shaft 6 there is mounted a worm wheel 69, which is engaged by the worm 68 on the side wall of the duplicating cylinder. The cylinder 1 may be exactly adjusted by rotation of the worm 68.

On the actuating rod 83 is provided an index locking device 70 which, by means of a spring 70', is pressed into an index hole in the bush 111, and thus locks the duplicating cylinder in its basic position.

The single functions of the machine are initiated by means of a pedal, hand lever or other equivalent arrangement. Upon depression of the rod 72 the same presses against an angle lever 73, which moves the rod 74 towards the side. The rod 74 is connected with the rod 74' by means of a locking hook 75. The latter is pivoted to the rod 74', and engages in a recess of rod 74. Since the downward movement of the rod 72 is a relatively large one, while the advance movement of the positioning device 9, which is actuated by the rods 74, 74', is only a small one, the driving means for the positioning device must be released at a sufficiently early stage by the foot release. This is performed by the fact that the hook 75 thrusts with its projection 75' against a pin 76, mounted on the frame and is thus lifted from the rod 74, so that the rod 74', and together therewith the positioning device 9, remains stationary, while the rod 74 continues to be moved by the pedal 72. On the rod 74' there is pivotally connected a lever 77, which carries the operating rod 78 pivotally connected with the sliding bearing 10. If, therefore, the rod 74', in association with the rod 74 and the angle lever 73, is withdrawn by the pedal 72, the positioning device 9 is advanced, and moves the card to be printed between the feed rollers 8 and 8'.

Immediately the hook 75 is lifted, the positioning device is withdrawn into the position of rest by the spring 77'.

The pedal 72 is furthermore connected with an angular member 79, which withdraws the rod 52 together with the lever 53 and the roller 54, which depress the released moisteners 16, the member 79 pressing against the pin 52' mounted on the rod 52. Immediately the rod 52 has been withdrawn the pawl 80 on the arm 3 moves into a recess in the rod 52 and holds the latter quite firmly in this position. Shortly before completion of the revolution on the part of the duplicating cylinder 1 the cam 81 on the latter lifts the pawl 80 out of the rod 52, so that this may be moved back by the spring 52". To the rod 52 there is secured an operating member 82, which engages over the index actuating rod 83. On the rod 83 is provided at a certain distance from the member 82 an abutment 83'. When the rod 52 is withdrawn by the pedal 72, the operating member 82 moves along the rod 83, and by striking against the abutment 83' moves back the rod 83, and accordingly the pin 70, so that the duplicating cylinder 1 is unlocked.

On the cylinder shaft 6 there is provided a bush 111, about which there freely rotates the sprocket wheel 110 cooperating with the endless chain 84. In association with the sprocket wheel 110 there is provided a gear wheel 108, which also rotates about the bush 111. On the latter there is secured the operating pawl 109. The bush 111, on which is mounted the worm wheel 69, communicates with the duplicating cylinder 1 by means of the worm 68, which is mounted on the cylinder 1 and engages with the worm wheel 69. Between the sprocket wheel 110 and the pawl wheel 108 there is situated the cam 107, against which there moves, loosely mounted, the cam portion 106 mounted on the index actuating rod 83. Immediately the member 106 is withdrawn the cam 107 is advanced by the pressure of the bolt 109' through the medium of the spring 109", and the pawl 109 moves into engagement with the ratchet wheel 108, so that the drum 1 is now rotated and the cam 107 is moved by the bolt 109'.

After one revolution of the cylinder 1 the cam 107 again moves against the member 106, and the pawl 109 is lifted from the gear wheel 108 by the bolt 109' moving against the cam 107, whereby the duplicating cylinder 1 is caused to remain stationary, while the gear wheel 108 rotates continuously.

Owing to the fact that the abutment 83' is mounted on the rod 83 at a certain distance from 82, it is accomplished that upon withdrawal of the rod 52 at first the released moisteners 16 are depressed and afterward is the duplicating cylinder released.

The operating spindle 46 for the part 47, the operating spindle 15 for the part 11, and the roller 66 of the device for indicating the next line to be printed are driven by an endless chain 84. The rotation of the spindle 46 and at the same time of the spindle 15 and the roller 66 through the medium of this chain is performed by the duplicating cylinder 1. On the spindle 46 there is mounted a gear wheel 89 engaged by a pawl 88, which is pushed back by the spring 88'. The pawl 88 is pivotally connected with the advancing lever 85 by the plate 87, and by the wheel 85' on the lever 85 moving against the pawl 86 on the cylinder 1 is lifted and thereby rotates to a certain extent the spindle 46. After leaving the pawl 86 the lever 85, the plate 87 and the pawl 88 are withdrawn into their normal position by a spring 87', whereby the pawl 88 recedes in resilient fashion and moves into the next tooth of the wheel 89.

If in the case of multi-line print it is desired to release or adjust a plurality of consecutive moisteners, pressure rollers and lines of the reading device, and also the positioning device, the member 47 is, by rotation of the spindle 46 by means of a hand-wheel 90, which is connected with the spindle 46 by gear wheels 91, displaced to a corresponding extent laterally, so that accordingly the pawl 48, which is located on the part 47, and depresses the requisite tongues 44, whereby the corresponding moistener 16 and the appertaining pressure rollers 2 are released for action in the manner described above, is set into operation.

Since upon each revolution of the duplicating cylinder 1 the spindle 46 is rotated, and accordingly the part 47 displaced in a lateral direction, it might occur that when the part 47 had already reached the end of the spindle 46 the machine, due to an oversight, might again be set into operation, and the spindle 46 additionally rotated, causing damage to the part 47 or also other parts of the apparatus. To prevent this there is provided on the spindle 46 a helical groove 46' passing at the ends of the spindle into an endless groove disposed vertically about the spindle. The groove 46' is engaged by the guide pin 47' on the part 47. The guide plate 47", which is secured with its one end to the part 47, is mounted at its other end to be displaceable on a shaft 92, whereby conjoint rotation of the part 47 upon rotation of the spindle 46 is rendered impossible. If the part 47 has reached the end of the spindle 46, and the guide pin 47' runs in the endless groove 46', the part 47 remains stationary despite additional rotation on the part of the spindle 46. The spring 93 on the shaft 92 exerts lateral pressure on the plate 47". Immediately the spindle 46 is turned backwards by means of the handle 90 the guide pin 47', due to the lateral pressure of the spring 93, again moves into the helical groove 46, and the part 47 now returns to the other end of the spindle. The tension of the spring 93 may be regulated by displacement of the setting ring 94 provided on the shaft 92.

The lock 11 pertaining to the positioning device is moved backwards and forwards on the spindle 15 in exactly similar manner, and the spindle 15 possesses exactly the same safety means as the spindle 46.

To prevent the machine from being set into motion before the card, wage bag or the like has been properly positioned, there is provided a locking means which is released by the card itself. On an oscillatory shaft 95 Fig. 5 situated above the table 7 there are provided at certain distances apart feelers 96, which engage in corresponding incisions in the table 7. On the shaft 95 there is furthermore provided a pawl 97, which engages behind a pin 98 provided on any one of the operating wheels of the machine. The card advanced by the positioning device 9 thrusts against the feelers 96, lifting the same and together therewith the pawl 97, moving the latter away from the pin 98. Under its own weight, or with the assistance of a spring, the lever 97, after the card has passed below the feelers 96, moves back, so that the pin 98 again comes to rest behind the pawl 97.

The pawls 55, 65 and 86 are secured to a yoke 101, which may be rocked about the screw 101'. In the yoke there is provided an elongated hole 102, through which passes a holding screw 103. By means of the grip 104 furnished at the opposite end of the yoke the latter, and together therewith the pawls 55, 65 and 86 mounted thereon, may be moved aside to such extent until the grip 104 engages in the hole 105 in the side wall of the cylinder 1, so that the pawls 55, 65 and 86 are placed out of action. This is necessary if the cylinder 1 requires to be rotated for the purpose of securing the original sheet thereon without simultaneous actuation of the moisteners, pressure rollers, etc.

When the line or lines just printed are again to be copied off, the pawls 55, 65 and 86 are also moved out of action in the manner described in the above in order to prevent the moisteners and counter-rollers just used from returning into their normal position, and the actuating mechanism from advancing and actuating the next moistener and counter-roller.

Fig. 7 shows a form of embodiment of the invention intended merely for single-line print. In place of the unlimited number of moisteners and pressure rollers, for example 35 of each, furnished on the machine for single or multi-line print, only one moistener and one pressure roller are here provided. In place of the part 47 (Figs. 2 and 2a) the moistener 16 moves along the spindle 46. The pressure roller 2 also moves along a spindle 112. The spindles 46 and 112 are connected with each other by the chain 84. The spindle 112, by which the roller 2 is laterally displaced, and the shaft 113, are connected by the plate 115 on the part 114, and are mounted in a common bearing 116. For adjusting the pressure of the roller 2 against the duplicating cylinder 1 the bearing member 116 may be displaced by means of the screw 117 in the lateral bearing 118.

The duplicating cylinder 1 is flattened off somewhat at that particular point which in the normal position of the machine is situated opposite the pressure roller 2, so that they do not touch each other in the normal position of the machine and the pressure roller 2 may be displaced laterally without touching the cylinder 1 and the original sheet located thereon.

Figure 9A:
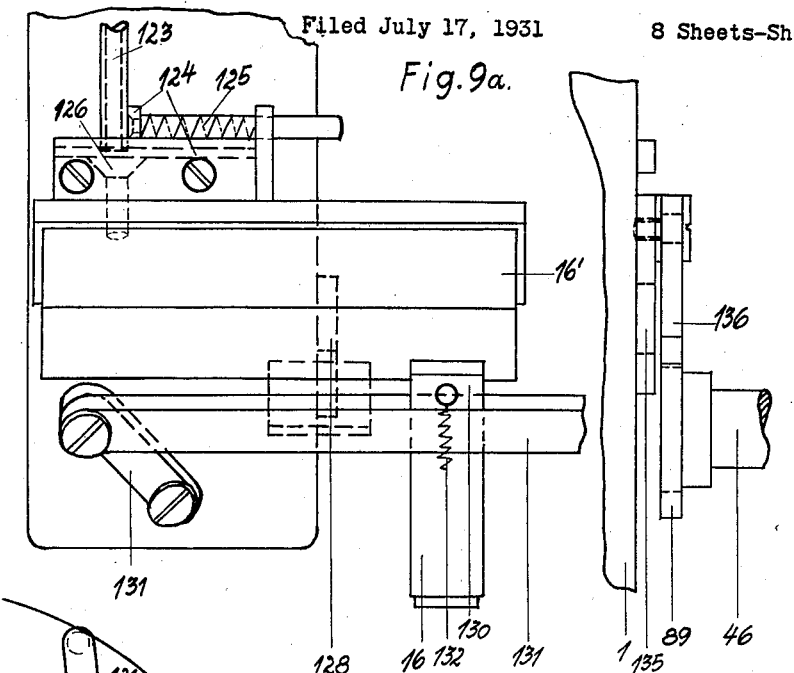
Fig. 9a is a front view of the moistening device for machines adapted for single-line print.
Figure 9B:
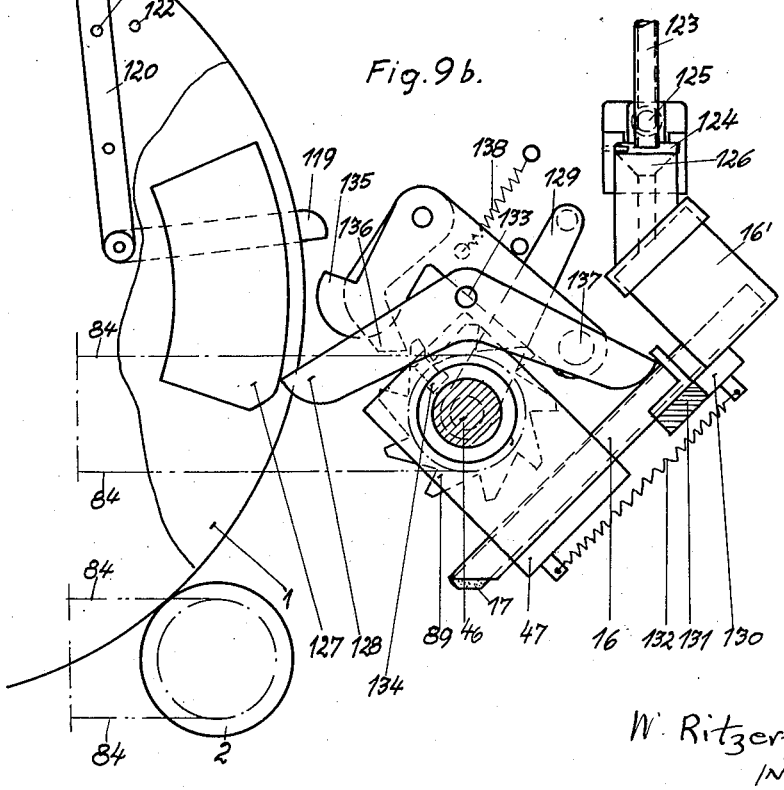
Fig. 9b is a side view thereof.

The moistening strip 17 in the moistener 16 shown in Figs. 9a and 9b is in communication with the absorptive material in the upper part 16' of the moistener 16. The lifting and lowering of the moistener 16 occurs automatically by means of the lever 128, which is rotary about the point 133 and is actuated by the cam 127 on the cylinder 1. A rod 131 extends over the entire length of the machine and engages below the abutment 130 on the container 16, and is lifted by the lever 128, so that the moistener 16 may be lifted at any point where the same happens to be and where it entered into operation. Immediately the lever 128, owing to the rotation of the duplicating cylinder 1, moves away from the cam 127, the moistener 16 is pressed under the action of the spring 132 against the card to be printed.

The additional movement laterally of the moistener 16 occurs in such fashion that the moistener 16 is displaced in a locking slide 47 on the spindle 46 by engagement of the guide pin 134 in the helical groove of the spindle 46 upon the rotation of the latter. The spindle 46 possesses at its one end a transport wheel 89. On the transport lever 135, which is rotary about 137 and is held in its normal position by a spring 138, there is arranged in movable fashion the pawl 136, which engages in the wheel 89, and upon depression of the lever 135 rotates the wheel 89, and accordingly the spindle 46, by the actuating pawl 119 mounted on the cylinder 1. The pawl 119 may be withdrawn by movement of the hand lever 120, in order to prevent actuation of the moistener 16 when the cylinder 1 requires to be rotated, for example for the purpose of affixing the original sheet. On the hand lever 120 there is furnished an index member 121, which snaps into holes 122 and thus holds the pawl 119 in one or the other position.

If it is not desired to print all lines consecutively, the moistener 16 and the pressure roller 2 are displaced by means of a handle 129 fitted on the spindle 46.

Replenishment of the liquid in the moistener 16 is always performed when the moistener is in its initial position. In the moistener 16 there is a filling aperture 126, the closure member 124 of which opens automatically immediately the moistener 16 returns to its initial position, as the closure member 124, which is mounted in resiliently displaceable fashion over the filling aperture 126, thrusts against the feed pipe 123 communicating with the reservoir. When the moistener 16 has reached its initial position, the feed pipe 123 is situated exactly above the filling aperture 126, so that liquid may then be readily passed from the reservoir 22. Immediately the moistener again returns the spring 125 moves the cover 124 over the aperture 126.

The consecutive release of the moistener 16, actuated by the cylinder 1, and the feed rollers 8 and 8', shown in Figs. 8a and 8b, is performed as follows:

About the bush 111, which is located on the duplicating cylinder shaft 6 and communicates with the cylinder by means of the worm wheel 69 and the worm 68, there rotates the sprocket wheel 110, which is connected with the ratchet wheel 108. Upon starting the machine the rod 83 together with the cam 106 is withdrawn by means of a foot release or the like, so that the pawl 109 on the disc 111', which pawl rests with the bolt 109' fitted thereon on the cam 106, moves into engagement with the operating wheel 108, so that the disc 111' mounted on the bush 111, and accordingly also the duplicating cylinder 1, are likewise moved. The disc 111' is, after a single rotation, stopped by an index pin 70. On the index pin 70 there acts a spring 70', the tension of which may be regulated by means of a screw 70''. On the disc 111' there is situated a pawl 140, which is actuated by the projection 144 secured to the rod 83. The pawl 140 engages with the ratchet wheel 143, resulting in the actuation of the rollers 8 and 8'. The pawls 109 and 140 and also the cam 106 and the projection 144 are so arranged in relation to each other that the pawl 140 is lifted somewhat earlier from the wheel 143 than the pawl 105 from the wheel 139. Since the moistening device is operated simultaneously with the duplicating cylinder 1, and by the same, it moves against the card to be printed before the latter is passed by the feed rollers 8 and 8' between the duplicating cylinder and the pressure roller. When the rod 83 is withdrawn, the two pawls 109 and 140 fall on to the wheel 139 and the wheel 143 respectively. The pawl 109 is immediately picked up by the wheel 139, while the pawl 140 falls somewhat in front of the next tooth of the wheel 143 on to the same, and does, therefore, not move the wheel 143 until by further rotation of the disc 111' the pawl 140 thrusts against the next tooth of the wheel 143. Shortly prior to completion of the revolution of the disc 111' the pawl 140, 141 thrusts against the projection 144 and is lifted by the wheel 143, whereby the latter remains stationary, while the pawl 140, which is secured to the disc 111', rotates to a slight additional extent until the pawl 109 is lifted by the cam 106 from the wheel 139, the disc 111' only then coming to a standstill. Since, however, the pawl 140 is additionally moved to a short extent by the disc 111', the same upon renewed actuation by the rod 83 does not fall again into the same tooth, but shortly in front of the next tooth of the wheel 143. In the drawings the corresponding positions of the pawl are designated 140, 140' and 141, 141'.

Each line copied from the original sheet is marked during the rotation of the duplicating cylinder 1. The marking device moves together with the moistener from line to line, and is actuated by the cylinder 1. Since the mark employed consists of a cross, an asterisk, a circle, a dot or the like, the device bearing the mark must be resilient and also capable of yielding in the direction of the line, as otherwise the impression on the original sheet would be blurred or might even cause damage to the sheet. The marking device may also consist of a small wheel serving to make a colored dash on the sheet. In this case the marking device does not require to be constructed so as to be capable of yielding.

On the part 47, which carries the moistener 16, and is mounted to be displaceable on the spindle 46, there is secured a plate 157 for carrying the marking device. In front of the cylinder 1 there is provided a shaft 146 furnished with a groove 146', which is engaged by a screw 149' mounted on the marking lever 149. The marking lever 149 may be capable of rotation on the plate 157 between the bearings 152.

At the one end of the shaft 146 there is situated a lever 150, against the pin 150' of which there thrusts the actuating lever 151 pivoted on the supporting arm 3. On the corresponding side of the duplicating cylinder 1 there is provided the actuating segment 154, which is displaceable and rotary about the bolt 153. The segment 154 possesses, for example, four actuating arms, which are of different width and thrust against the wheel 151' on the lever 151, and thus press the lever 151 against the pin 150' of the lever 150, whereby the shaft 146, together with the marking device mounted thereon, is moved against the original sheet tensioned about the cylinder 1. The segment 154 possesses, in accordance with the number of arms, four projections 154', which rest against a pin 155. The projections 154' are pressed against this pin 155 by springs 156.

To adjust the segment 154, it is merely necessary to slightly displace the segment on the bolt 153 until the projections 154' move out of engagement with the pin 155, and to rotate the segment to such extent until the corresponding actuating arm is situated in the operative position. After release of the segment 154 the spring 156 again presses the same with the corresponding projection 154' against the pin 155. On the marking lever 149 there is mounted so as to be capable of rotation the bearing 158 carrying the resilient marking member 159. Mounted in rotary fashion on the plate 157 is the inking pad 160, which is pivotally connected with the lever 149 by a plate 161, so that at the moment when the rod 146, on which the marking device or the lever 149 respectively is mounted, is rocked, the pad 160 resting on the marking member 159 is moved aside. After the roller 151' mounted on the lever 151 has moved away from the particular arm of the segment 154 the shaft 146, and accordingly the marking device, is moved back into its position of rest by the resilient pin 147, which is mounted on the shaft 146, and the spring 148.

To prevent the card from moving into contact at the non-moistened portions with the original sheet tensioned about the cylinder 1 there are provided in the apparatus for merely single-line print on the part 47 two wipers 145 made of wire or sheet metal, which extend to the side of the pressure roller to a point beyond the printing point, i. e., the point of contact between the duplicating cylinder 1 and the pressure roller 2, and press down the card on both sides of the roller 2.

It will be understood that no restriction is made to the specific constructions shown, and that various modifications are possible within the meaning of the above description and the annexed claims without departing from the spirit of the invention.

What I claim as new and desire to secure by Letters Patent is:

1. Duplicating apparatus comprising in combination, a duplicating cylinder, a plurality of moistening devices and pressure rollers alongside of said cylinder, a releasing mechanism actuating the moistening devices, said mechanism acting to release the pressure rollers and entering during a brief period into contact therewith and, immediately after release of the pressure rollers, again moving clear of the introductory space for the copy sheets.

2. Duplicating apparatus comprising in combination, a duplicating cylinder, a plurality of moistening devices alongside of said cylinder, and means supporting the moistening devices for movement solely in a plane perpendicular to the copy sheet introduced for printing.

3. Duplicating apparatus comprising in combination, a duplicating cylinder, a plurality of moistening devices and pressure rollers alongside of said cylinder, each pressure roller being equal in width to a single line and means supporting said pressure rollers for rotary and swinging movement.

4. Duplicating apparatus comprising in combination, a duplicating cylinder, a plurality of moistening devices alongside of said cylinder, and a releasing device, the moistening devices being normally held in elevated position by said releasing device and adapted to be released by said releasing device whereby the moistening devices are freed to move to operative position.

5. Duplicating apparatus comprising in combination, a duplicating cylinder, a plurality of moistening devices alongside of said cylinder, a releasing device, the moistening devices being normally held in elevated position by said releasing device and adapted to be released by said releasing device whereby the moistening devices are freed to move to operative position, and means operated in response to actuation of the releasing device to actuate the pressure rollers.

6. Duplicating apparatus comprising in combination, a duplicating cylinder, a plurality of moistening devices alongside of said cylinder, a releasing device, the moistening devices being normally held in elevated position by said releasing device and adapted to be released by said releasing device whereby the moistening devices are freed to move to operative position, said releasing device including a spindle provided with a helical groove and a slide member thereon provided with a portion engaging said groove.

7. Duplicating apparatus comprising in combination, a duplicating cylinder, a plurality of moistening devices alongside of said cylinder, a releasing device, the moistening devices being normally held in elevated position by said releasing device and adapted to be released by said releasing device whereby the moistening devices are freed to move to operative position, and means for automatically advancing the releasing device whereby the moistening devices are released in line succession.

8. Duplicating apparatus comprising in combination, a duplicating cylinder, a plurality of moistening devices alongside of said cylinder, a releasing device, the moistening devices being normally held in elevated position by said releasing device and adapted to be released by said releasing device whereby the moistening devices are freed to move to operative position, said releasing device including a spindle provided with a helical groove and a slide member thereon provided with a portion engaging said groove, and means for automatically actuating said spindle to advance the slide member step by step and release the moistening devices in line succession.

9. Duplicating apparatus comprising in combination, a duplicating cylinder, a plurality of moistening devices alongside of said cylinder, a releasing device, the moistening devices being normally held in elevated position by said releasing device and adapted to be released by said releasing device whereby the moistening devices are freed to move to operative position, said releasing device including a spindle provided with a helical groove and a slide member thereon provided with a portion engaging said groove, and means actuated by said duplicating cylinder for intermittently rotating said spindle to advance the slide member step by step and release the moistening devices in line succession.

10. Duplicating apparatus comprising in combination, a duplicating cylinder, a plurality of moistening devices alongside of said cylinder, a releasing device, the moistening devices being normally held in elevated position by said releasing device and adapted to be released by said releasing device whereby the moistening devices are freed to move to operative position, said releasing device including a spindle provided with a helical groove and a slide member thereon provided with a portion engaging said groove, means adapted to be actuated by said duplicating cylinder for intermittently rotating said spindle to advance the slide member step by step and release the moistening devices in line succession, and means for interrupting the operation of the spindle from the duplicating cylinder to permit adjustment of the spindle independently thereof.

11. Duplicating apparatus comprising in combination, a duplicating cylinder, a plurality of moistening devices alongside of said cylinder, a releasing device, the moistening devices being normally held in elevated position by said releasing device and adapted to be released by said releasing device whereby the moistening devices are freed to move to operative position, said releasing device including a spindle provided with a helical groove and a slide member thereon provided with a portion engaging said groove, and means for manually operating the spindle to adjust said slide member.

12. Duplicating apparatus comprising in combination, a duplicating cylinder, a plurality of moistening devices alongside of said cylinder, means normally retaining said moistening devices in elevated position, adjustable means for releasing said moistening devices, means to arrest the movement of the released moistening devices, and movable control means associated with the arresting means to actuate the latter and permit the moistening devices to move to operative position.

13. Duplicating apparatus comprising in combination, a duplicating cylinder, a plurality of moistening devices alongside of said cylinder, means normally retaining said moistening devices in elevated position, adjustable means for releasing said moistening devices, means to arrest the movement of the released moistening devices, and movable control means associated with the arresting means to actuate the latter and permit the moistening devices to move to operative position, said arresting means including an oscillating member having a stop thereon permitting partial movement of the moistening devices toward operating position following their release by said adjustable means and adapted, when oscillated by said control means, to permit full operative movement of the released moistening devices.

14. Duplicating apparatus comprising in combination, a duplicating cylinder, a plurality of moistening devices alongside of said cylinder, means normally retaining said moistening devices in elevated position, adjustable means for releasing said moistening devices, means to arrest the movement of the released moistening devices, movable control means associated with the arresting means to actuate the latter and permit the moistening devices to move to operative position, and means normally urging said moistening devices to operative position.

15. Duplicating apparatus comprising in combination, a duplicating cylinder, a plurality of moistening devices alongside of said cylinder, means normally retaining said moistening devices in elevated position, adjustable means for releasing said moistening devices, means to arrest the movement of the released moistening devices, movable control means associated with the arresting means to actuate the latter and permit the moistening devices to move to operative position, and means controlled by the duplicating cylinder to re-set the arresting means.

16. Duplicating apparatus comprising in combination, a duplicating cylinder, a plurality of moistening devices alongside of said cylinder, means normally retaining said moistening devices in elevated position, adjustable means for releasing said moistening devices, means to arrest the movement of the released moistening devices, movable control means associated with the arresting means to actuate the latter and permit the moistening devices to move to operative position, said control means operating to initiate the return movement of the arresting means, a locking member associated with the arresting means, and means controlled by said duplicating cylinder to successively release the locking member and re-set the arresting means.

17. Duplicating apparatus comprising in combination, a duplicating cylinder, a plurality of moistening devices alongside of said cylinder, and means for shifting the position of the moistening devices to vary the point of contact thereof with the inserted copy sheet.

18. Duplicating apparatus comprising in combination, a duplicating cylinder, a plurality of moistening devices alongside of said cylinder, means for shifting the position of the moistening devices to vary the point of contact thereof with the inserted copy sheet, the last mentioned means including an eccentric, and spring means normally maintaining the moistening devices in engagement with said eccentric.

19. Duplicating apparatus comprising in combination, a duplicating cylinder, a plurality of moistening devices alongside of said cylinder, means normally tending to move the moistening devices to operative position, means normally retaining said moistening devices in elevated position, adjustable means for releasing said moistening devices, means to arrest the movement of the released moistening devices, movable control means acting to prevent displacement of the arresting means under the influence of the released moistening devices until the copy sheet to be printed has been placed in position, and means for thereafter actuating said control means to permit movement of the arresting means together with the moistening devices.

20. Duplicating apparatus comprising in combination, a duplicating cylinder, a plurality of moistening devices alongside of said cylinder, means normally retaining said moistening devices in elevated position, adjustable means for releasing said moistening devices, means for actuating said adjustable means from said duplicating cylinder to advance said adjustable means into position for successively releasing the several moistening devices, and means for interrupting the actuation of said adjustable means from said duplicating cylinder.

21. Duplicating apparatus comprising in combination, a duplicating cylinder, a plurality of moistening devices alongside of said cylinder, means normally retaining said moistening devices in elevated position, adjustable means for releasing said moistening devices, means for actuating said adjustable means from said duplicating cylinder to advance said adjustable means into position for successively releasing the several moistening devices, and means for interrupting the actuation of said adjustable means from said duplicating cylinder, the last mentioned means including actuating members carried by the duplicating cylinder and movable thereon to an inoperative position.

22. Duplicating apparatus comprising in combination, a duplicating cylinder, means for introducing copy sheets into the apparatus, said means comprising feed rollers, and a positioning device for introducing copy sheets to the feed rollers, and means for displacing said positioning device laterally to the extent of the width of a line space subsequent to each duplicating operation.

23. Duplicating apparatus comprising in combination, a duplicating cylinder, an adjustable positioning device including a positioning member adapted to engage an incision in the edge of a copy sheet, drive means for the duplicating cylinder, means connecting said drive means with said positioning device, feed rollers adapted to engage a copy sheet introduced by said positioning device, and means for displacing said positioning device laterally to the extent of the width of a line subsequent to each duplicating operation.

24. Duplicating apparatus comprising in combination, a duplicating cylinder, an adjustable positioning device including a positioning member adapted to engage an incision in the edge of a copy sheet, drive means for the duplicating cylinder, means connecting said drive means with said positioning device, feed rollers adapted to engage a copy sheet introduced by said positioning device, and means for displacing said positioning device laterally to the extent of the width of a line space subsequent to each duplicating operation, said last mentioned means including a screw device operated by drive means.

25. Duplicating apparatus comprising in combination, a duplicating cylinder, a plurality of moistening devices alongside of said cylinder, and means for shifting the duplicating cylinder relatively to the moistening devices, the last mentioned means including a shaft supporting the duplicating cylinder and a worm and worm wheel carried by the shaft and roller for effecting relative tangential displacement thereof.

26. Duplicating apparatus comprising in combination, a duplicating cylinder, a plurality of moistening devices alongside of said cylinder, drive means for the duplicating cylinder, a locking device coacting with said drive means, copy sheet controlled means for releasing said locking device, said copy sheet controlled means including an oscillatory member, and feelers carried by said member and disposed in the path of a copy sheet introduced into the apparatus.

27. Duplicating apparatus comprising in combination, a duplicating cylinder, a plurality of moistening means dispensing a readily volatilizing solvent, drive means for the duplicating cylinder, and releasable means to lock said duplicating cylinder in initial position for each operation.

28. Duplicating apparatus comprising in combination, a duplicating cylinder, a plurality of moistening means dispensing a readily volatilizing solvent, drive means for the duplicating cylinder, and releasable means to lock said duplicating cylinder in initial position for each operation, said locking means including a pin.

29. Duplicating apparatus comprising in combination, a duplicating cylinder, a plurality of moistening devices alongside of said cylinder, a positioning table, drive means for the duplicating cylinder, a roller for supporting a copy in position adjacent the positioning table whereby a portion of said copy is visible, a resilient pressure roller coacting with the copy supporting roller, and means to operate said copy supporting roller.

30. Duplicating apparatus comprising in combination, a duplicating cylinder, a plurality of moistening devices alongside of said cylinder, a positioning table, drive means for the duplicating cylinder, a roller for supporting a copy in position adjacent the positioning table whereby a portion of said copy is visible, a resilient pressure roller coacting with the copy supporting roller, and means to operate said copy supporting roller from said drive means.

31. Duplicating apparatus comprising in combination, a duplicating cylinder, a plurality of moistening devices alongside of said cylinder, a positioning table, means for selectively actuating the moistening devices, copy sheet advancing means associated with the positioning table, a common drive for the duplicating cylinder, the moistening device actuating means and the card advancing means, and a member common to the three last mentioned means for initiating operation thereof.

32. Duplicating apparatus comprising in combination, a duplicating cylinder, a plurality of moistening devices alongside of said cylinder, movable copy sheet positioning means, drive means for the duplicating cylinder, manually controlled means for initiating operation of the duplicating cylinder from the drive means, and means actuated by the manually controlled means to operate the copy sheet positioning means in advance of the initiation of operation of the duplicating cylinder.

33. Duplicating apparatus comprising in combination, a duplicating cylinder, a plurality of moistening devices alongside of said cylinder, movable copy sheet positioning means, drive means for the duplicating cylinder, manually controlled means for initiating operation of the duplicating cylinder from the drive means, means adapted to be actuated by the manually controlled means to operate the copy sheet positioning means in advance of the initiation of operation of the duplicating cylinder, the last mentioned means including coacting rod members and a pawl member normally coupling the rod members, and means to release said pawl and permit movement of one rod member independently of the other.

34. Duplicating apparatus comprising in combination, a duplicating cylinder, a plurality of moistening devices alongside of said cylinder, means for advancing the moistening devices into operative position with respect to an inserted copy sheet, said advancing means including a manually operable member, movable copy sheet positioning means, and means actuated by the manually operable member to operate the copy sheet positioning means prior to the advance of the moistening devices.

35. Duplicating apparatus comprising in combination, a duplicating cylinder, a plurality of moistening devices alongside of said cylinder, means for advancing the moistening devices into operative position with respect to an inserted copy sheet, said advancing means including a manually operable member, movable copy sheet positioning means, and means actuated by the manually operable member to operate the copy sheet positioning means prior to the advance of the moistening devices, the operating means for the copy sheet positioning means and the means for advancing the moistening devices being constituted in part by relatively movable rods.

36. Duplicating apparatus comprising in combination, a duplicating cylinder, a plurality of moistening devices alongside of said cylinder, feed rollers, drive means for the duplicating cylinder and feed rollers, manually controlled means for initiating operation of the duplicating cylinder and feed rollers from the drive means, and means actuated by the manually controlled means to move the moistening devices to operative position with respect to an inserted copy sheet in advance of the initiation of operation of the printing and feed rollers.

37. Duplicating apparatus comprising in combination, a duplicating cylinder, means for fastening an original sheet on said cylinder, a positioning table, an axially displaceable moistening device equalling in width a single line on said sheet, a laterally displaceable pressure roller, and means engageable with said moistening device in all positions thereof to move said device into and out of operation.

38. An apparatus as claimed in claim 37, comprising an operative connection between the duplicating cylinder and the means engageable with the moistening device in all positions thereof.

39. Duplicating apparatus comprising in combination, a duplicating cylinder, a moistening device displaceable alongside of said cylinder, a member intermittently operated by said cylinder, and means to displace the moistening device step by step in response to movement of said intermittently operated member.

40. Duplicating apparatus comprising in combination, a duplicating cylinder, a moistening device and a pressure roller displaceable alongside of said cylinder, a member intermittently operated by said duplicating cylinder, means to displace the moistening device step by step in response to movement of said intermittently operated member, and means to transmit movement from said intermittently operated member to said pressure roller to impart axial movement to said roller.

41. Duplicating apparatus comprising in combination, a duplicating cylinder, a moistening device displaceable alongside of said cylinder, a member intermittently operated by said duplicating cylinder, means to advance the moistening device step by step in response to movement of said intermittently operated member, and manually operable means to adjust said moistening device.

42. Duplicating apparatus comprising in combination, a duplicating cylinder, a moistening device displaceable alongside of said cylinder, a member intermittently operated by said duplicating cylinder, means to advance the moistening device step by step in response to movement of said intermittently operated member, and manually controlled means for interrupting the operation of said member by said duplicating cylinder.

43. Duplicating apparatus comprising in combination, a duplicating cylinder, a moistening device displaceable alongside of said cylinder, a member arranged to be operated intermittently by the duplicating cylinder, and means for displacing the moistening device step by step in accordance with the movement of the said intermittently operable member, said intermittently operable member comprising a spindle formed with a helical groove and a portion sliding thereon, the said portion having a member engaging in the said groove.

44. An apparatus as claimed in claim 37, characterized by the provision of means for supplying liquid to the said moistening device.

45. Duplicating apparatus comprising in combination, a duplicating cylinder, a moistening device displaceable alongside of said cylinder, a feed pipe for the supply of liquid for the moistening device, said moistening device including a container having an aperture adapted, in a predetermined position of the container, to register with the feed pipe.

46. Duplicating apparatus comprising in combination, a duplicating cylinder, a moistening device displaceable alongside of said cylinder, a feed pipe for the supply of liquid for the moistening device, said moistening device including a container having an aperture adapted, in a predetermined position of the container, to register with the feed pipe, and valve means adapted to be actuated by the container for controlling the communication between the feed pipe and the container.

47. An apparatus as claimed in claim 37, comprising means for introducing copy sheets into the apparatus.

48. An apparatus as claimed in claim 37, comprising feed rollers for introducing copy sheets into the apparatus.

49. Duplicating apparatus comprising in combination, a duplicating cylinder, a moistening device displaceable alongside of said cylinder, means for introducing copy sheets into the apparatus, means for moving the moistening device into the operative position, and means adapted, after the moistening device has been moved into position, to be actuated and to cause the movement of the copy sheet-introducing means.

50. Duplicating apparatus comprising in combination, a duplicating cylinder, a moistening device displaceable alongside of said cylinder, copy sheet feeding rollers, means for operatively positioning the moistening device with respect to a copy sheet, and means adapted to be operated subsequently to the operative positioning of the moistening device to initiate operation of the feed rollers.

51. Duplicating apparatus comprising in combination, a duplicating cylinder, a moistening device displaceable alongside of said cylinder, copy sheet feed rollers, means for operatively positioning the moistening device with respect to a copy sheet, means adapted to be operated subsequently to the operative positioning of the moistening device to initiate operation of the feed rollers, the last mentioned means including dual pawl and ratchet devices associated respectively with the duplicating cylinder and feed rollers, and means for delaying the operation of one of said pawl and ratchet devices with respect to the other.

52. Duplicating apparatus comprising in combination, a duplicating cylinder arranged to support an original sheet and means for marking the original sheet on the cylinder at each line copied therefrom.

53. Duplicating apparatus comprising in combination, a duplicating cylinder arranged to support an original sheet, means for marking the original sheet on the cylinder at each line copied therefrom, and means for operating said marking means from said cylinder.

54. Duplicating apparatus comprising in combination, a duplicating cylinder, a moistening device displaceable alongside of said cylinder, means for displacing the moistening device with respect to the lines on the original sheet mounted on said duplicating cylinder, and a marking device for applying a mark to the original sheet and carried by and movable with the moistening device.

55. Duplicating apparatus comprising in combination, a duplicating cylinder, a moistening device displaceable alongside of said cylinder, means for displacing the moistening device with respect to the lines on an original sheet mounted on said cylinder, a marking device for applying a mark to the original sheet and carried by and movable with the moistening device, and means for operating the marking means from the duplicating cylinder.

56. Duplicating apparatus comprising in combination, a duplicating cylinder, means for marking an original sheet mounted on the printing roller at each line copied therefrom, and means for operating said marking means from said duplicating cylinder, said marking means being arranged to yield in the direction of rotation of the duplicating cylinder.

57. Duplicating apparatus comprising in combination, a duplicating cylinder, means for marking an original sheet mounted on the duplicating cylinder at each line copied therefrom, and an inking device associated with the marking means.

58. Duplicating apparatus comprising in combination, a duplicating cylinder, means for marking an original sheet mounted on the duplicating cylinder at each line copied therefrom, and an inking device associated with the marking means and arranged to swing downward at the initiation of movement of the marking means and adapted upon the return of the latter to engage therewith.

59. Duplicating apparatus comprising in combination, a duplicating cylinder, a marking device for marking the original during the progress of duplication of the lines thereof, means for actuating the marking device in timed relation to the movement of the duplicating cylinder, and means for varying the moment of actuation of the marking device relatively to the movement of the duplicating cylinder.

60. Duplicating apparatus comprising in combination, a duplicating cylinder, a marking device for marking an original sheet mounted on said cylinder during the progress of duplication of the lines thereof, means for actuating the marking device in timed relation to the movement of the duplicating cylinder, and means for varying the time relationship between the actuation of the marking device and the movement of the duplicating cylinder, said last mentioned means including a manually adjustable member provided with variably arranged operating portions engageable with the actuating means for the marking device at different positions of the duplicating cylinder.

61. An apparatus as claimed in claim 37, in which the fastening means for the original sheet includes a clamping bar mounted to swing about its longitudinal edge on the circumference of the duplicating cylinder.

62. An apparatus as claimed in claim 37, in which the fastening means for the original sheet includes a clamping bar mounted to swing about its longitudinal edge on the circumference of the duplicating cylinder, and resilient clamping means mounted to turn on the circumferential area of the duplicating cylinder.

63. Duplicating apparatus comprising in combination, a duplicating cylinder, a moistening device displaceable alongside of said cylinder, and means for shifting the duplicating cylinder relatively to the moistening device.

64. Duplicating apparatus comprising in combination, a duplicating cylinder, a moistening device displaceable alongside of said cylinder, and means for varying the position of the duplicating cylinder in relation to the moistening device, these means comprising a shaft supporting the said duplicating cylinder, a worm, and a worm wheel, the said worm and worm wheel being mounted on the said shaft and said cylinder and permitting of tangential displacement of the said cylinder.

65. An apparatus as claimed in claim 37, comprising drive means for the duplicating cylinder, and releasable means to lock said duplicating cylinder in initial position for each operation.

66. An apparatus as claimed in claim 37, comprising drive means for the duplicating cylinder, and releasable means to lock said duplicating cylinder in initial position for each operation, said locking means including a pin.

67. An apparatus as claimed in claim 37, comprising means for exposing a second copy of the original in legible script.

68. Duplicating apparatus comprising in combination, a duplicating cylinder, a moistening device, a pressure roller, and means for depressing a copy sheet at opposite sides of the pressure roller to prevent contact of said sheet with the portions of the original mounted on said cylinder which are not to be printed.

69. Duplicating apparatus comprising in combination, a duplicating cylinder, a moistening device displaceable alongside of said cylinder, said displaceable moistening device including a supporting member slidably and non-rotatably mounted.

70. Duplicating apparatus comprising in combination, a duplicating cylinder, a moistening device, a pressure roller displaceable alongside of said cylinder, and a screw feed device for the pressure roller and the moistening device, said screw feed device including a spindle having a spiral groove therein terminating at each end in an annular groove adapted to receive a pin member.

71. An apparatus as claimed in claim 37, comprising a common drive for the duplicating cylinder and the moistening device actuating means and a member common to said cylinder and moistening device for initiating operation thereof.

72. An apparatus as claimed in claim 37, comprising feed rollers, drive means for the duplicating cylinder and the feed rollers, means for initiating operation of the duplicating cylinder and feed rollers from the drive means, and means actuated by the operation initiating means to move the moistening device to operative position with respect to an inserted copy sheet in advance of the initiation of operation of the duplicating cylinder and feed rollers.

73. Duplicating apparatus comprising in combination, a duplicating cylinder, a plurality of moistening devices alongside of said cylinder, and means for shifting the duplicating cylinder relatively to the moistening devices.

74. Duplicating apparatus comprising in combination, a duplicating cylinder, a plurality of moistening devices alongside of said cylinder, and drive means for said duplicating cylinder, a locking device arranged to coact with said drive means, and copy sheet controlled means for releasing said locking device.

75. Duplicating apparatus comprising in combination, a duplicating cylinder mounted for revolution about its axis, a pressure roller having the width of a single line and mounted for revolution about an axis parallel to the axis of said duplicating cylinder, a moistening device, and copy sheet feeding means between said pressure roller and said moistening device.

76. Duplicating apparatus comprising in combination, a duplicating cylinder mounted for revolution about its axis, an axially displaceable pressure roller having the width of a single line and mounted for revolution about an axis parallel to the axis of said duplicating cylinder, a moistening device, and copy sheet feeding means between said pressure roller and said moistening device.

77. Duplicating apparatus comprising in combination, a duplicating cylinder mounted for revolution about its axis, an axially displaceable pressure roller having the width of a single line and mounted for revolution about an axis parallel to the axis of said duplicating cylinder, mechanical means for moving said pressure roller towards said duplicating cylinder, means for feeding a copy sheet between said cylinder and said roller, and means for depositing a liquid on such copy sheet in the space confined between the planes of the end faces of said roller.

78. Duplicating apparatus comprising in combination, a duplicating cylinder mounted for revolution about its axis, an axially displaceable pressure roller having the width of a single line and mounted for revolution about an axis parallel to the axis of said duplicating cylinder, means for moving said pressure roller towards said duplicating cylinder, a moistener associated with said pressure roller and mechanical means for moving said moistener in the space confined between the planes of the end faces of said roller.

79. Duplicating apparatus comprising in combination, a duplicating cylinder mounted for revolution about its axis, an axially displaceable pressure roller having the width of a single line and mounted for revolution about an axis parallel to the axis of said duplicating cylinder, means for moving said pressure roller towards said duplicating cylinder, a moistener associated with said pressure roller, means for axially displacing said roller and said moistener, and means for moving said moistener in the space confined between the planes of the end faces of said roller.

80. Duplicating apparatus comprising in combination, a substantially horizontal support, two arms extending in substantially parallel spaced relation above and being fixed by one end to said support, a duplicating cylinder freely supported by said arms above said support, a pressure roller mounted below said cylinder and actuating mechanism for said roller extending from said cylinder alongside of one of said arms towards said roller.

81. Duplicating apparatus comprising in combination, a substantially horizontal support, two U-shaped arms arranged in substantially parallel spaced relation and being fixed to said support by one of their legs, the other legs extending freely above and substantially in parallel with said support, a duplicating cylinder supported by the top legs, a pressure roller having the width of a single line to be duplicated being arranged below said cylinder and actuating mechanism for said roller extending from said cylinder alongside of one of said arms towards said roller.

82. Duplicating apparatus comprising in combination, a substantially horizontal support, two U-shaped arms arranged in substantially parallel spaced relation and being fixed to said support by one of their legs, the other legs extending freely above and substantially in parallel with said support, a duplicating cylinder and a moistener supported by the top legs, a pressure roller having the width of a single line to be duplicated being arranged below said cylinder and actuating mechanism for said roller extending from said cylinder alongside of one of said arms towards said roller.

83. Duplicating apparatus comprising in combination, a substantially horizontal support, two U-shaped arms arranged in substantially parallel spaced relation and being fixed to said support by one of their legs, the other legs extending freely above and substantially in parallel with said support, a duplicating cylinder supported by the top legs, an axially displaceable pressure roller having the width of a single line to be duplicated being arranged below said cylinder and actuating mechanism for said roller extending from said cylinder alongside of one of said arms towards said roller.

84. Duplicating apparatus comprising in combination, a substantially horizontal support, two U-shaped arms arranged in substantially parallel spaced relation and being fixed to said support by one of their legs, the other legs extending freely above and substantially in parallel with said support, a duplicating cylinder and an axially displaceable moistener supported by the top legs, an axially displaceable pressure roller having the width of a single line to be duplicated being arranged below said cylinder and actuating mechanism for said roller extending from said cylinder alongside of one of said arms towards said roller.

85. Duplicating apparatus comprising in combination, a substantially horizontal support, two U-shaped arms arranged in substantially parallel spaced relation and being fixed to said support by one of their legs, the other legs extending freely above and substantially in parallel with said support, a duplicating cylinder and a plurality of moisteners supported by the top legs, a plurality of pressure rollers having the width of a single line to be duplicated being arranged below said cylinder and actuating mechanism for said roller extending from said cylinder alongside of one of said arms towards said rollers.

86. Duplicating apparatus comprising in combination, a duplicating cylinder, a plurality of moisteners arranged in juxtaposition alongside of said cylinder and mechanical means for varying the position of any of said moisteners in a radial plane.

87. Duplicating apparatus comprising in combination, a duplicating cylinder, a plurality of moisteners arranged in juxtaposition alongside of said cylinder, a pressure roller associated with each moistener, and mechanical means for varying the position of the moistener and the roller of each pair in a radial plane.

88. Duplicating apparatus comprising in combination, a duplicating cylinder, a plurality of moisteners arranged in juxtaposition alongside of said cylinder, a pressure roller associated with each moistener, mechanical means common to all said moisteners for varying the position of any of said moisteners in a radial plane and means for thereafter moving the roller associated with said moistener towards said cylinder.

89. Duplicating apparatus comprising in combination, a duplicating cylinder, a plurality of moisteners arranged in juxtaposition alongside of said cylinder, a pressure roller associated with each moistener, and common means displaceable in parallel to the cylinder axis for varying the operative condition of any of said moisteners and of the pressure roller associated with it.

90. Duplicating apparatus comprising in combination, a duplicating cylinder, a plurality of moisteners arranged in juxtaposition alongside of said cylinder, a pressure roller associated with each moistener, a releasing member operatively connected with each moistener and arranged for reciprocatory movement, and setting means associated with said releasing members.

91. Duplicating apparatus comprising in combination, a duplicating cylinder, a plurality of moisteners arranged in juxtaposition alongside of said cylinder, a pressure roller associated with each moistener, a releasing member operatively connected with each moistener and arranged for reciprocatory movement, and a releasing member setting means displaceable alongside of said row of members.

92. Duplicating apparatus comprising in combination, a duplicating cylinder, a plurality of moisteners arranged in juxtaposition alongside of said cylinder, a pressure roller associated with each moistener, a releasing tongue associated with each moistener and arranged for reciprocatory movement, an actuating means displaceable alongside of said row of tongues, and spring-controlled means for moving the released moistener into operative position.

93. Duplicating apparatus comprising in combination, a duplicating cylinder, a plurality of moisteners arranged in juxtaposition alongside of said cylinder, a pressure roller associated with each moistener, a releasing tongue associated with each moistener and arranged for reciprocatory movement, an actuating means displaceable alongside of said row of tongues, spring-controlled means for moving the released moistener into operative position, and spring-controlled means in the way of said tongues for releasing the pressure rollers associated with the released moisteners.

94. Duplicating apparatus comprising in combination, a duplicating cylinder, a plurality of moisteners arranged in juxtaposition alongside of said cylinder, a pressure roller associated with each moistener, a releasing tongue associated with each moistener and arranged for reciprocatory movement, an actuating means displaceable alongside of said tongues, spring-controlled means for moving the released moistener into operative position, spring-controlled means in the way of said tongues for releasing the pressure roller associated with said released moistener, and means for returning said tongues into inoperative position immediately after release of said roller.

95. Duplicating apparatus comprising in combination, a duplicating cylinder, a plurality of moisteners arranged in juxtaposition alongside of said cylinder, a liquid reservoir extending alongside of said cylinder and liquid conveying means connecting each moistener with said reservoir.

96. Duplicating apparatus comprising in combination, a duplicating cylinder, a plurality of moisteners arranged in juxtaposition alongside of said cylinder, a pressure roller associated with each moistener, a releasing tongue associated with each moistener and arranged for reciprocatory movement, an actuating pawl arranged for displacement alongside of said tongues, and means for stepwise moving said pawl from one tongue to the other.

97. Duplicating apparatus comprising in combination, a duplicating cylinder, a plurality of moisteners arranged in juxtaposition alongside of said cylinder, means for initiating displacement of each moistener towards, but short of its operative position, and means for thereafter causing common displacement of all released moisteners into operative position.

98. Duplicating apparatus comprising in combination, a duplicating cylinder, a plurality of moisteners arranged in juxtaposition alongside of said cylinder, means for initiating displacement of each moistener towards, but short of its operative position, means for thereafter causing common displacement of all released moisteners into operative position, and means for returning all said moisteners together into their position of rest.

99. Duplicating apparatus comprising in combination a duplicating cylinder, moistening devices and counter pressure rollers alongside of said cylinder, each pressure roller being equal in width to a single line and means supporting said pressure rollers for rotation and movement towards the axis of the duplicating cylinder.

100. Duplicating apparatus comprising in combination a duplicating cylinder, moistening devices and counter pressure rollers alongside of said cylinder, a releasing device normally holding said moistening devices in an elevated and inoperative position and adapted to release same to move to an operative position.

101. Duplicating apparatus comprising in combination a duplicating cylinder, moistening devices and counter pressure rollers alongside of said cylinder, a releasing device normally holding said moistening devices in an elevated and inoperative position and adapted to release same to move to an operative position, and means operated in response to the actuation of said releasing device to actuate the pressure rollers.

102. Duplicating apparatus comprising in combination a duplicating cylinder, fastening means for a copyable original on said cylinder, said fastening means including a clamping bar having a hand grip adapted to swing about its longitudinal edge mounted on the circumference of said duplicating cylinder to hold one end of said original and resilient clamping means pivotally mounted on said duplicating cylinder adapted to open laterally to hold the other end of said original.

103. Duplicating apparatus comprising in combination a duplicating cylinder, means for mounting a copyable original sheet on said duplicating cylinder, means associated with said apparatus adapted to support a copy of the original in legible script and to show a limited portion thereof substantially corresponding to the operative portion of the copyable original.

104. An apparatus for duplicating bookkeeping and like entries comprising a duplicating cylinder, means for tensioning a copyable original about said cylinder, a positioning table, an axially displaceable moistening device of single line width, means engageable with said moistening device in all positions thereof to move said device into and out of operation, a laterally displaceable pressure roller, and means for adjusting the lateral position of said pressure roller with respect to said duplicating cylinder.

105. Duplicating apparatus comprising in combination a substantially horizontal support having substantially parallel upper and lower arms on each side, said upper arms being adapted to hold a duplicating cylinder and moistening devices, and said lower arms being adapted to hold a counter pressure roller and a feeding table.

106. Duplicating apparatus comprising in combination a substantially horizontal support having substantially parallel upper and lower arms on each side, said upper arms being adapted to hold a duplicating cylinder, moistening devices and driving means therefor, and said lower arms being adapted to hold a counter pressure roller, a feeding table and their corresponding driving means.

107. Duplicating apparatus comprising in combination a duplicating cylinder, and means for introducing copy sheets into the apparatus, said means including a rotatable cylindrical member co-operating with a plurality of relatively narrow and coaxial rollers, each of said rollers being individually journalled in a pivoted arm, and resilient means for each of said arms pressing said arms and said rollers towards said cylindrical member.

108. Duplicating apparatus comprising in combination a duplicating cylinder, and means for introducing copy sheets into the apparatus, said means including a pair of co-operating rotatable cylindrical members, at least one of said members being constituted by a plurality of relatively narrow rollers, each of said rollers being individually journalled in a pivoted arm, and resilient means individually journalled in a pivoted arm, and resilient means for each of said arms pressing said arms and said rollers toward said other cylindrical member whereby said rollers will be capable of individual displacement toward and from said cylindrical member to compensate for irregular thickness of articles introduced for printing into the apparatus.

109. Duplicating apparatus comprising in combination a duplicating cylinder, and means for introducing copy sheets into the apparatus, said means including co-operating rotatable cylindrical members, at least one of said members being constituted by a plurality of rollers of substantially copy line like breadth, a pivoted arm for each of said rollers adapted to rotatably support a roller, and resilient means for each of said arms to press said arm and the roller associated therewith against the other cylindrical member whereby said rollers are normally held in coaxial position and are capable of being resiliently displaced to compensate for irregular thickness of articles introduced for printing into the apparatus.

110. In a duplicating apparatus, the combination which comprises a rotatable duplicating cylinder bearing copyable mirror-script original, feed rollers for introducing copy sheets into the apparatus, and a displaceable positioning member adapted to engage an incision in the edge of said copy sheets whereby said copy sheet will be introduced into the bight of said feed rollers in a pre-determined lateral position and will be printed onto by a selected portion of said copyable original in accordance with the lateral position of said positioning member.

111. In a duplicating apparatus, the combination which comprises a rotatable duplicating cylinder bearing copyable mirror-script original, means for driving said cylinder, feed rollers for introducing copy sheets into the apparatus, a displaceable positioning member adapted to engage an incision in the edge of said copy sheets, and means associated with said driving means for actuating said positioning member in advance of the operation of the duplicating cylinder to introduce a copy sheet into the bight of said feed rollers in a predetermined lateral position whereby said copy sheet will be printed onto by a portion of said copyable original in accordance with the lateral position of said positioning member.

112. In a duplicating apparatus, the combination which comprises a rotatable duplicating cylinder bearing copyable mirror-script original, means for driving said cylinder, feed rollers for introducing copy sheets into the apparatus, a movable positioning device including a laterally displaceable positioning member adapted to engage an incision in the edge of said copy sheet, and means associated with said driving means for moving said positioning device towards the said feed rollers at the commencement of each operation of said duplicating cylinder whereby said copy sheet will be introduced into the bight of said feed rollers and will be printed onto by a portion of said copyable original in accordance with the lateral position of said positioning member.

113. In a duplicating apparatus, the combination which comprises a rotatable duplicating cylinder bearing copyable mirror-script original, means for driving said cylinder, feed rollers for introducing copy sheets into the apparatus, a positioning device capable of being displaced laterally and towards said feed rollers, a positioning member associated with said device adapted to engage an incision in the edge of said copy sheet, means associated with said driving means for moving said positioning device towards the said feed rollers, at the commencement of each operation of said duplicating cylinder, and means for moving said positioning device laterally to the extent of a copy line after each operation of said duplicating cylinder whereby said copy sheet will be introduced in a predetermined lateral position into the bight of said feed rollers and will be printed onto by a selected portion of said copyable original in accordance to the lateral position of said positioning member.

114. In a duplicating apparatus, the combination which comprises a duplicating cylinder, a plurality of counter pressure rollers capable of selectively co-operating with said duplicating cylinder, means for fastening a copyable original on said cylinder said means including a clamping bar forming part of the cylindrical surface of said duplicating cylinder and adapted to swing about its longitudinal edge on the circumference of said cylinder, and a hand grip for said clamping bar.

115. In a duplicating apparatus, the combination which comprises a duplicating cylinder, a plurality of counter pressure rollers capable of selectively co-operating with said duplicating cylinder, means for introducing copy sheets into the apparatus in a predetermined lateral position, said means including feed rollers, a displaceable positioning device, and a resilient, stationary and plate-like member arranged in front of said positioning device for smoothing out bent copy sheets.

WILHELM RITZERFELD.